Patented May 6, 1930

1,757,864

UNITED STATES PATENT OFFICE

DAVID ISENBERG, OF MIAMI, FLORIDA

PAINT

No Drawing. Application filed December 9, 1929. Serial No. 412,933.

The object of my invention is to produce a paint that will preserve metal and wood.

A further object of my invention is to provide a paint that will not be affected by salt water and which will repel the adhesion of barnacles to ships.

My invention is placed on the market in a form suitable for applying it by a brush, and in a form suitable for use with a spraying machine, and is compounded of the following ingredients combined in substantially the following proportions:

*Dry powder pigments*

10 pounds of dry zinc oxide
6 pounds of hydraulic white cement
15 pounds of dry carbonated white lead
5 pounds of dry powdered casein glue
10 pounds of dry iron oxide
.2 pounds of calcium hydroxide
5 pounds of dry sugar of lead

*Liquids*

10 pounds of rapeseed oil
30 pounds white banana oil
15 pounds China wood oil
14 pounds of ethyl alcohol
1 pound of water
4 pounds turpentine
8 pounds of oil dryers
7 pounds of oil varnish
5 pounds of animal gall The dry and liquid ingredients above specified give a total weight of 147 pounds, or thirteen gallons of paint.

In compounding my improved paint I pass all dry pigments through a screen at least twice and then place these sifted pigments into a mixer, and then add the liquids and mix for about two hours. The mass is then taken from the mixer and placed into a closed tank where it ferments for about two days. The mass is taken from the tank and put through a stone or other grinding machine and ground twice. It is then poured into suitable containers which are provided with an air tight closure.

Of course the proportions may, within reasonable limits, be varied without affecting the efficiency of my paint.

From experiments I find that my paint will preserve metal, is water proof, and is substantially sun and water proof.

What I claim is:

A paint comprising zinc oxide, white hydraulic cement, carbonated white lead, casein glue, iron oxide, calcium hydroxide, sugar of lead, rapeseed oil, white banana oil, China wood oil, ethyl alcohol, water, turpentine, oil dryers, oil varnish, and animal gall, in substantially the proportions specified.

In testimony whereof I affix my signature.

DAVID ISENBERG.